(12) United States Patent
Fainstain

(10) Patent No.: US 10,121,221 B2
(45) Date of Patent: Nov. 6, 2018

(54) METHOD AND APPARATUS TO ACCELERATE RENDERING OF GRAPHICS IMAGES

(71) Applicant: Advanced Micro Devices, Inc., Sunnyvale, CA (US)

(72) Inventor: Evgene Fainstain, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 15/408,095

(22) Filed: Jan. 17, 2017

(65) Prior Publication Data

US 2017/0206625 A1 Jul. 20, 2017

Related U.S. Application Data

(60) Provisional application No. 62/279,892, filed on Jan. 18, 2016.

(51) Int. Cl.
| | | |
|---|---|---|
| *G06T 17/00* | (2006.01) | |
| *G06T 1/20* | (2006.01) | |
| *G06T 15/00* | (2011.01) | |
| *G06T 17/10* | (2006.01) | |
| *G06T 7/20* | (2017.01) | |

(52) U.S. Cl.
CPC .............. *G06T 1/20* (2013.01); *G06T 7/20* (2013.01); *G06T 15/005* (2013.01); *G06T 17/10* (2013.01)

(58) Field of Classification Search
None
See application file for complete search history.

(56) References Cited

U.S. PATENT DOCUMENTS

| | | | |
|---|---|---|---|
| 5,835,096 A | | 11/1998 | Baldwin |
| 6,057,847 A | * | 5/2000 | Jenkins .................. G06T 15/20 |
| | | | 345/422 |

(Continued)

OTHER PUBLICATIONS

Wikipedia, The Free Encyclopedia, "Alan Wake", Remedy Entertainment, Release Date May 18, 2010, 17 pgs., available at: https://en.wikipedia.org/wiki/Alan_wake, USA (Retrieved Jan. 16, 2017).

*Primary Examiner* — Martin Mushambo
(74) *Attorney, Agent, or Firm* — Volpe and Koenig, P.C.

(57) ABSTRACT

Described is a method and apparatus to accelerate rendering of 3D graphics images. When rendering, the transformation matrix (or equivalent) used for projecting primitives is modified so that a resulting image is smaller and/or warped compared to a regular unmodified rendering. The effect of such transformation is fewer pixels being rendered and thus a better performance. To compute the final image, the warped image is rectified by an inverse transformation. Depending on the warping transformation used, the resulting (rectified) image will be blurred in a controlled way, either simulating a directional motion blur, location-dependent sharpness/blurriness or other blurring effects. By intelligently selecting the warping transformation in correspondence with the rendered scene, overall performance is increased without losing the perceived fidelity of the final image. For example, if the directional motion blur matches the movement of the camera, the resulting effect is an improved rendering quality, at a better performance.

20 Claims, 8 Drawing Sheets

(56) References Cited

U.S. PATENT DOCUMENTS

| | | | | |
|---|---|---|---|---|
| 6,414,684 B1* | 7/2002 | Mochizuki | ............... | G06T 13/40 345/427 |
| 6,806,876 B2 | 10/2004 | Klein | | |
| 7,038,679 B2* | 5/2006 | Klein | ..................... | G06T 7/20 345/419 |
| 7,248,261 B1 | 7/2007 | Hakura | | |
| 7,876,332 B1* | 1/2011 | Donham | ................ | G06T 15/005 345/421 |
| 8,547,395 B1* | 10/2013 | Hutchins | ................. | G06T 11/40 345/611 |
| 2006/0215036 A1* | 9/2006 | Chung | ............... | H04N 5/23248 348/208.4 |
| 2006/0244745 A1* | 11/2006 | Majer | .................. | G06F 3/04815 345/419 |
| 2008/0122835 A1* | 5/2008 | Falco, Jr. | ................. | G06T 19/20 345/419 |
| 2008/0122840 A1* | 5/2008 | Falco | ...................... | G06T 15/00 345/420 |
| 2010/0073366 A1* | 3/2010 | Tateno | .................... | G06T 17/20 345/419 |
| 2010/0085357 A1* | 4/2010 | Sullivan | ................... | G06T 15/06 345/420 |
| 2011/0050853 A1* | 3/2011 | Zhang | ................... | H04N 13/026 348/44 |
| 2014/0028703 A1* | 1/2014 | Pajak | ..................... | H04N 19/46 345/619 |

\* cited by examiner

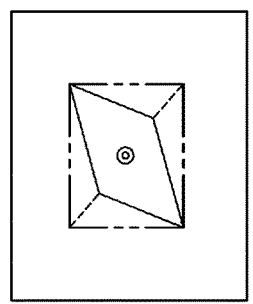
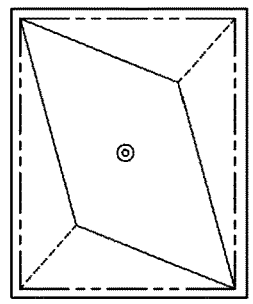
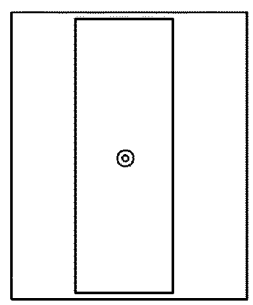
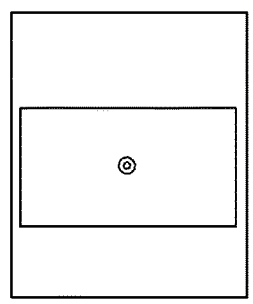
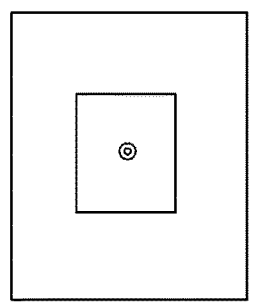
FIG. 7A — Resulting image will be blurred.
FIG. 7B — Resulting image will be blurred in X direction, but sharp in Y.
FIG. 7C — Resulting image will be blurred in Y direction, but sharp in X.
FIG. 7D — Resulting image will be blurred in "-45°" degrees direction, but sharp in "+45°" degrees direction.
FIG. 7E — Resulting image will be a little blurry, but more blurry in "-45°" degrees direction.

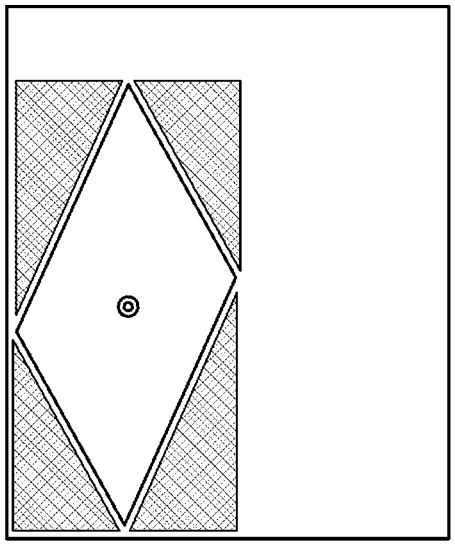

Additional shifting and rotation may be implemented to perform further optimizations. The shifting and rotation is only visible on an intermediate surface - on the final surface the image always looks geometrically the same.

FIG. 8B

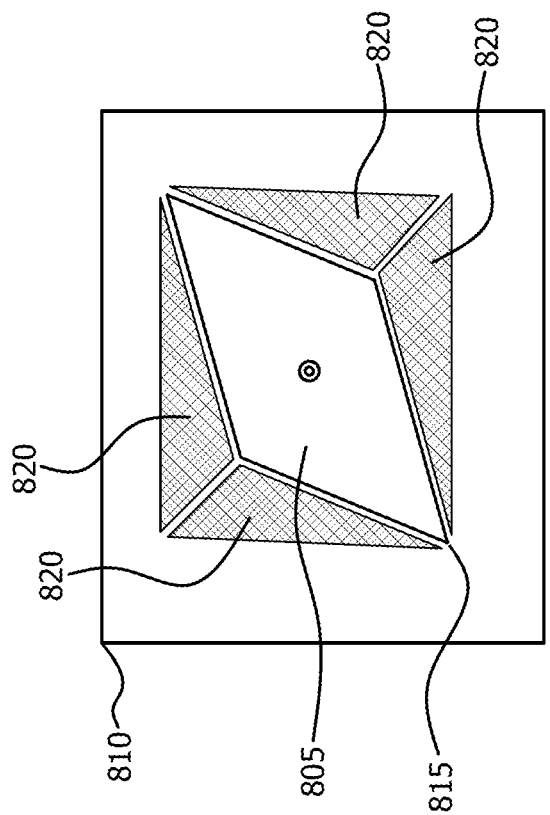

To tell the HW not to render outside the parallelogram, two approaches are used in conjunction. First, the view area is defined as an enclosing rectangle - the HW will not draw outside it. Second - the remaining "corners" are painted by depth mask to prevent drawing. The use of "predicates" will be highly efficient here.

FIG. 8A

METHOD AND APPARATUS TO ACCELERATE RENDERING OF GRAPHICS IMAGES

CROSS REFERENCE TO RELATED APPLICATION

This application claims the benefit of U.S. provisional application No. 62/279,892, having a filing date of Jan. 18, 2016, which is incorporated by reference as if fully set forth.

BACKGROUND

As 3D content, (such as games, simulations, medical imaging etc.), becomes increasingly complicated, the ability to render smoothly and maximize framerates while providing the best resolution, quality and effects becomes difficult. For example, a variety of techniques are used to increase framerates during periods when a scene is changing rapidly during a game. These techniques trade off performance against different types of quality degradation.

BRIEF DESCRIPTION OF THE DRAWINGS

A more detailed understanding can be had from the following description, given by way of example in conjunction with the accompanying drawings wherein:

FIGS. 7A-7E are illustrative diagrams of blurring effect in accordance with certain implementations; and FIGS. 8A and 8B are illustrative diagrams of parallelograms in accordance with certain implementations.

DETAILED DESCRIPTION

Described herein is an apparatus and method to accelerate rendering of graphics images. Rendering instructions are received by a graphics processor from a processor to build a 3D scene. Prior to rendering a 2D image based on the 3D geometry, a projection matrix is modified by the graphics processor to reduce a view area along, for example, the camera motion direction. A reduced image corresponding to the reduced view area is rendered onto an intermediate surface. When the reduced image is completely generated at the intermediate surface, the reduced image is rectified or stretched and rendered onto a surface for display. This produces an image of the correct size but that is blurred along, for example, the camera motion direction. This provides variable rendering quality and variable framerates depending on camera motion. In particular, the resolution is dynamically changed on a per-frame basis, depending on camera motion, that is seemingly imperceptible to a user. As a result, the method allows for low-resolution equivalent performance with high-resolution detail levels.

Figure 1:
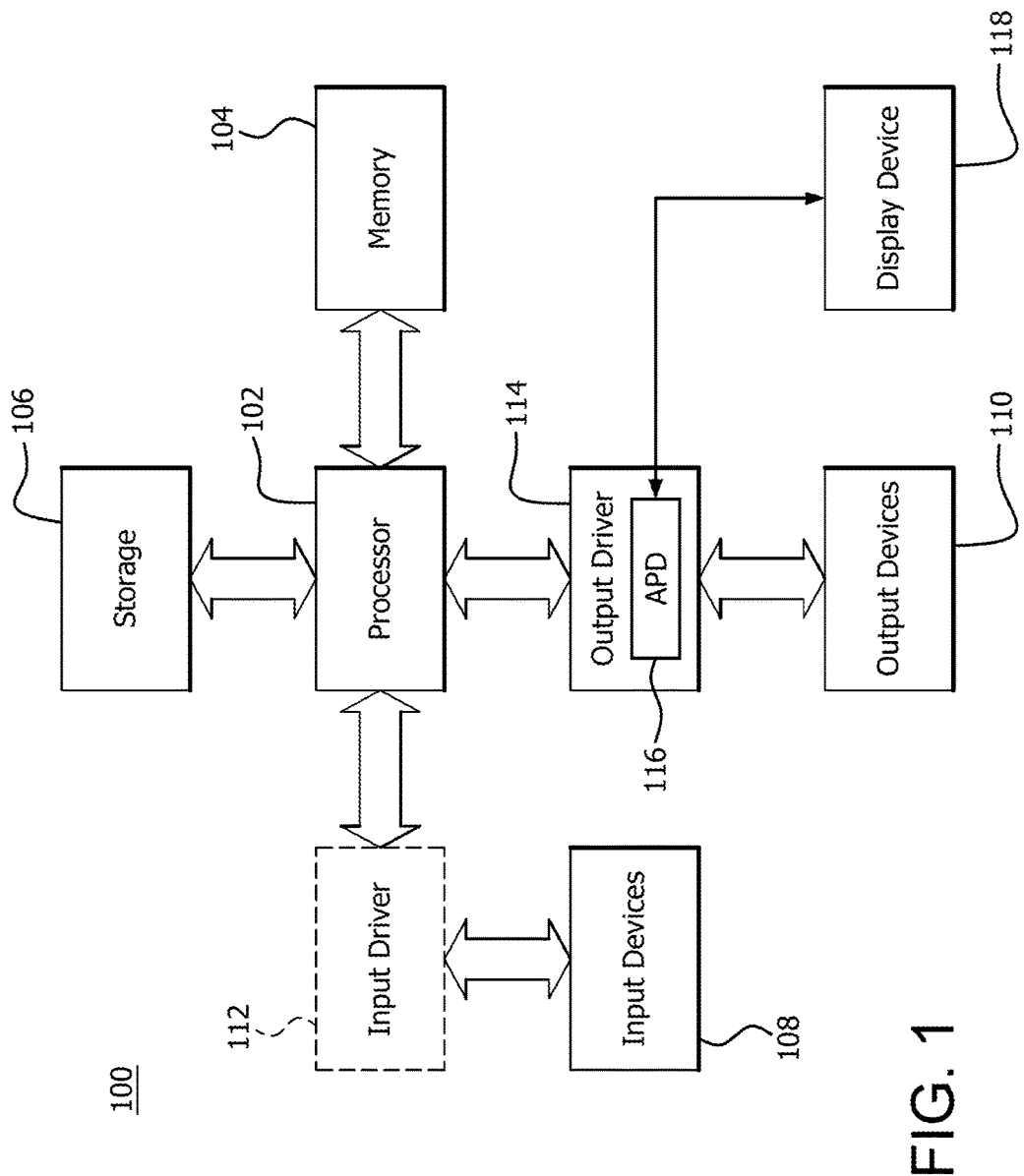
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is be located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD is configured to accept compute commands and graphics rendering commands or instructions from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
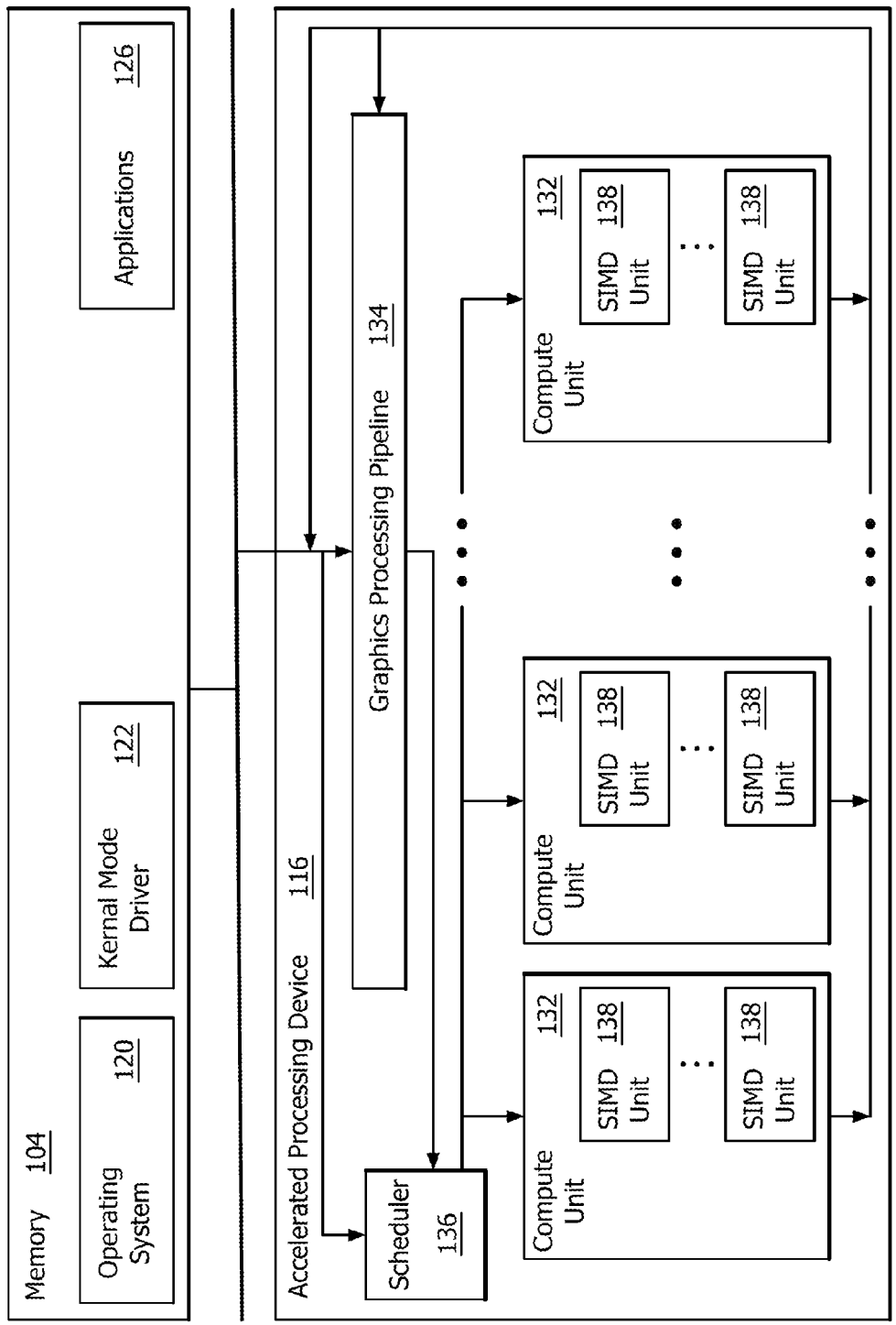
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
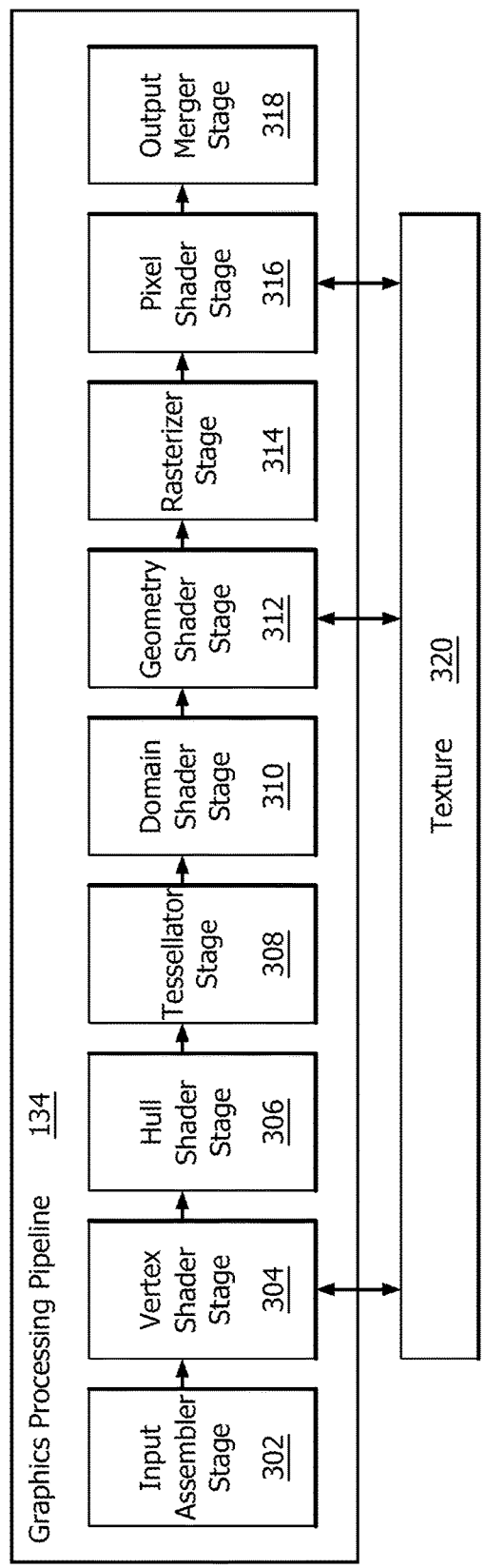
FIG. 3 is a block diagram illustrating a graphics processing pipeline, according to an example.

FIG. 3 is a block diagram showing additional details of the graphics processing pipeline 134 illustrated in FIG. 2. Although FIG. 3 is discussed with respect to APD 116, graphics processing pipeline 134 is applicable to any processor configured for graphics processing. The graphics processing pipeline 134 includes stages that each performs specific functionality. The stages represent subdivisions of functionality of the graphics processing pipeline 134. Each stage is implemented partially or fully as shader programs executing in the programmable processing units 202, or partially or fully as fixed-function, non-programmable hardware external to the programmable processing units 202.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertexes of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations. Herein, such transformations are considered to modify the coordinates or "position" of the vertices on which the transforms are performed. Other operations of the vertex shader stage 304 modify attributes other than the coordinates.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the programmable processing units 202.

The geometry shader stage 312 performs vertex operations on a primitive-by-primitive basis. A variety of different types of operations can be performed by the geometry shader stage 312, including operations such as point sprint expansion, dynamic particle system operations, fur-fin generation, shadow volume generation, single pass render-to-cubemap, per-primitive material swapping, and per-primitive material setup. In some instances, a shader program that executes on the programmable processing units 202 perform operations for the geometry shader stage 312.

The rasterizer stage 314 accepts and rasterizes simple primitives generated upstream. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a shader program that executes on the programmable processing units 202.

The output merger stage 318 accepts output from the pixel shader stage 316 and merges those outputs, performing operations such as z-testing and alpha blending to determine the final color for a screen pixel.

Texture data, which defines textures, are stored and/or accessed by the texture unit 320. Textures are bitmap images that are used at various points in the graphics processing pipeline 134. For example, in some instances, the pixel shader stage 316 applies textures to pixels to improve apparent rendering complexity (e.g., to provide a more "photorealistic" look) without increasing the number of vertices to be rendered.

In some instances, the vertex shader stage 304 uses texture data from the texture unit 320 to modify primitives to increase complexity, by, for example, creating or modifying vertices for improved aesthetics. In one example, the vertex shader stage 304 uses a height map stored in the texture unit 320 to modify displacement of vertices. This type of technique can be used, for example, to generate more realistic looking water as compared with textures only being used in the pixel shader stage 316, by modifying the position and number of vertices used to render the water. In some instances, the geometry shader stage 312 accesses texture data from the texture unit 320.

Figure 4:
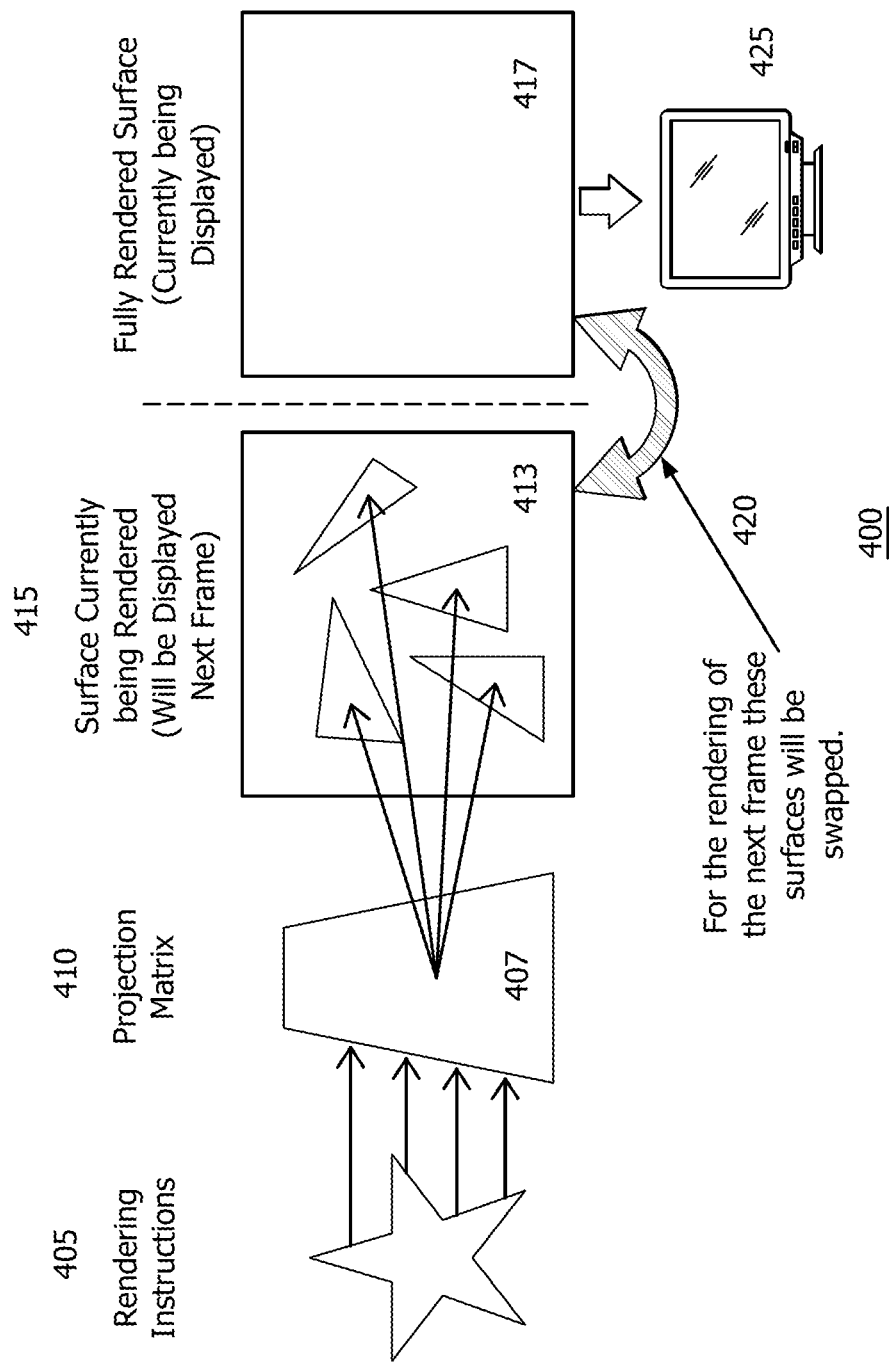
FIG. 4 is a diagram of rendering flow using a graphics processing pipeline of FIG. 3.

FIG. 4 is a diagram of rendering flow 400 using a graphics processing pipeline, such as graphics processing pipeline 134, to ultimately display a 3D image. Rendering instructions for a frame, which include an array of coordinates for the 3D image, are received at a processor implementing graphics processing pipeline 134, such as APD 116, from a processor, such as processor 102 (block 405). For purposes of illustration, a processor implementing a graphics processing pipeline will be referred to as a graphics processor. The array of coordinates are processed using a projection matrix 407 (block 410) to generate 2D coordinates in screen or display space, which are then rendered onto a surface 413 (block 415). Surface 413 is then swapped with surface 417 (block 420) for purposes of displaying the frame on display 425.

When rendering a 3D image, the graphics processor has two major tasks to perform: vertex calculations and pixel calculations. Vertex calculations are dependent upon the geometrical complexity of the scene, and the pixel calculations depend upon the amount of pixels that need to be rendered. In 3D games, it takes at least twice as much time to perform pixel shading than vertex shading, and considering the increasing demand for higher resolutions this ratio will only increase. Therefore one trivial method to improve rendering performance is to decrease the rendering resolution, but of course this would mean a less sharp/detailed scene. Moreover, while it is possible to configure the 3D hardware to work at a certain resolution, it is not possible to reconfigure for a different resolution on a per-frame basis.

The apparatus and method described herein obtains low-resolution equivalent performance with high-resolution detail level by providing variable rendering quality and variable framerates which depend on scene and/or camera motion. In particular, the resolution is dynamically changed on a per-frame basis depending on rendering load and/or camera motion. This is implemented by adding an additional rendering step which renders a reduced 2D image based on the 3D image onto a temporary or intermediate surface, which is then texture mapped to the display or screen. Moreover, the method reduces the quality of the rendered images at times when the human perception is less sensitive to quality.

The described apparatus and method takes advantage of properties related to framerates, lag times and human perception. For example, slower framerates can cause larger lag times and can be perceived by users who are, for example, playing first person shooter (FPS) games. In general, the greater the rendering framerate, the lower the input lag. But this is not always the case. Input lag is only important when interaction is expected from the user. For example, when watching a movie, defining "input lag" is meaningless since there is no input; framerate on the other hand is important. In an interactive environment, where there is no need for immediacy of reaction, the input lag is also not as important. For example, when flying a plane you don't expect an immediate reaction. Input lag is important for FPS or fighting games, where a split second delay can make a shooter miss, or be shot. Advanced FPS players are very sensitive to input lag and will not accept a game that has a noticeable lag. Even if the framerate is relatively low (15 fps), but the input lag is minimal ($1/15$ sec), the game is much more playable than a 120 fps game with a ¼ sec lag.

Moreover, when the rendered scene is mostly static, framerate is generally unimportant because an observer or user cannot see the framerate's effect when nothing is moving. When there is motion, (for example you are turning your gaze direction from right to left), then every object will appear several times on the screen. The greater the framerate, the more times it will appear. The object will appear to be "moving smoothly" or "moving in steps". Consequently, when there is motion, it is important to have higher framerates. On the other hand, when there is motion, the observer is much less sensitive to the detail in the moving image. Summarizing, for static scenes better detail is needed, but lower framerates can be used, and for moving scenes higher framerates are needed, but lower detail can be used.

As noted above, techniques that take advantage of framerate and lag time properties also need to be unnoticeable to the user. In general, human perception does not always perceive all the available information. For example, when the rendered image is mostly static, or slowly changing, it is possible for the observer to concentrate on the finer details of the image and hence image quality is very important. However, if everything is changing quickly, (e.g., imagine looking out of a window of a moving train), then the image "seems" blurry, while actually being as sharp as always. This blur (often called "motion blur") is anisotropic, and most details in the direction of motion are lost, while resolution/details in the direction perpendicular to the motion vector is preserved.

Figure 5:
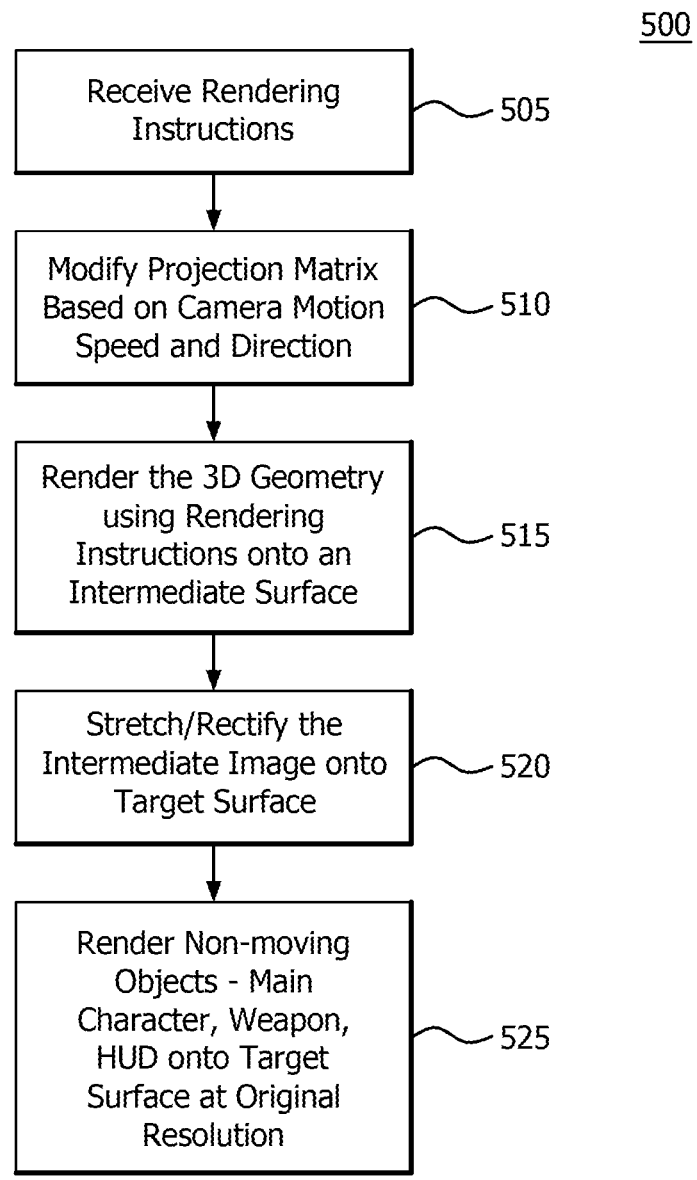
FIG. 5 is a flow chart of a method to accelerate rendering of graphics images in accordance with certain implementations.

FIG. 5 is a high level flow chart of a method 500 to accelerate rendering of graphics images in accordance with certain implementations. The method increases the framerate when there is scene or camera motion without perceptible visible artifacts. In particular, the method reduces the quality of the rendered images at times when the human perception is less sensitive to quality. This is done on a per frame basis. Rendering instructions for a frame, which include an array of coordinates for the 3D image, are received at a graphics processor (block 505). A projection/transformation matrix is modified based on camera motion speed and direction to generate a reduced area 2D image that is less than the screen area and appropriate rendering instructions are modified to reflect this change (block 510). The reduced area 2D image can be smaller and/or warped, (i.e. squashed, sheared, rotated and the like). The rendering instructions are processed through the graphics processing pipeline to render the 3D geometry onto an intermediate surface, (now a reduced area 2D image or intermediate image), (block 515). This can involve multiple passes through the graphics processing pipeline. The reduced area 2D image is rendered onto a target surface, while being rectified (transformed, stretched, etc.) to match the screen size (block 520). Information objects or non-moving objects that are not subject to the blurring are then rendered onto the target surface (block 525). The information objects can include but is not limited to heads-up display, onscreen display information, statistics, and FPS weapon, for example.

Figure 6:
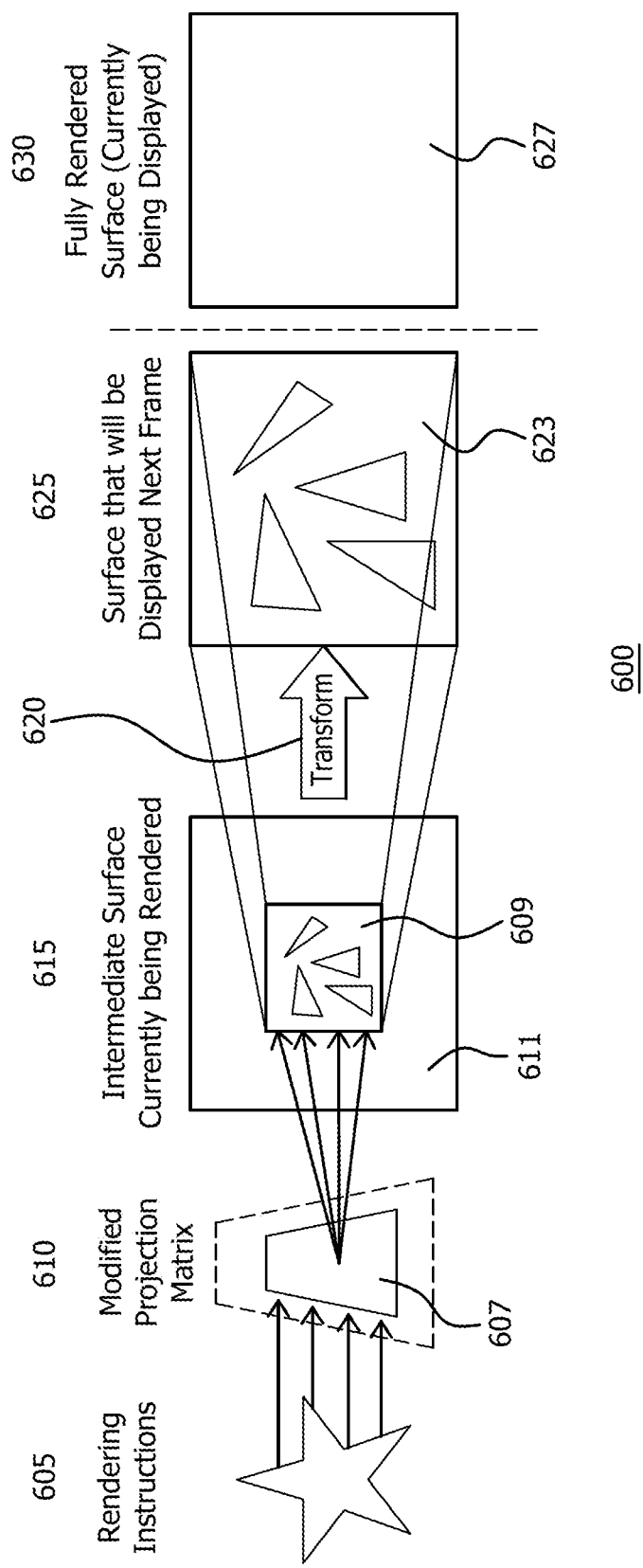
FIG. 6 is a diagram of rendering flow using the method of FIG. 5 in accordance with certain implementations.

FIG. 6 is a rendering flow 600 of method 500 to accelerate rendering of graphics images in accordance with certain implementations. Rendering instructions for a frame, which include an array of coordinates for a 3D image, are received at a graphics processor (block 605). The array of coordinates is then processed using a modified projection matrix 607 to generate (block 610) and render, via a graphics processing pipeline, a reduced 2D image 609 onto intermediate surface 611 (block 615). In particular, modified projection matrix 607 causes reduced 2D image 609 by effecting a 2D affine transformation of the 3D image, where the boundaries of the 3D image are now a parallelogram that fits entirely in the screen or display area. The modification in the projection matrix 607 is implemented by using a reduction factor or warping transformation along the camera motion direction. In an implementation, different transformations and/or reduction factors can be used depending on screen position. This can result in different blurring in different parts of the image. For instance, there is less need for sharpness at the periphery than at the center of the image. This can lead to further performance optimization. In an implementation, slower moving objects (in camera view) can be identified and rendered on to a pre-target surface 623 to avoid visible blurring artifacts. In an implementation, different objects can have different reduction factors by executing the method several times either in cascade or in parallel.

As a result of the modified projection matrix transformation, the area defined by the parallelogram consists of fewer pixels and consequently requires less hardware processing time (e.g., less work for a pixel shader). Moreover, the graphics processor is instructed not to render the areas outside the parallelogram using a variety of techniques as described herein below.

An additional rendering pass transforms (rectifies or stretches) reduced 2D image 609 (block 620) and renders the transformed 2D image (rectified or stretched) onto a pre-target surface 623 (block 625). The transformation (block 620) rectifies using an affine (or a more complex) transformation and produces a normally scaled full screen image. That is, the transformation implements a rectification rendering pass that is an inverse affine (or a more complex) transformation and results in resolution scaling in the direction of camera motion, i.e., directional resolution. The resulting 2D image is blurred compared to an unaltered rendered 2D image but performance, as measured by at least framerates, is increased without visible artifacts. In an implementation, information objects that are not subject to the blurring can then rendered onto the pre-target surface 623. The information objects can include, but are not limited to, onscreen display information, heads-up display, statistics, and the FPS weapon, for example. In effect, rendering is separated into two phases: 1) rendering of the scene using the direction-specific blurring, and then 2) rendering of information objects. Pre-target surface 623 is then swapped with target surface 627 (block 630) (as part of a double buffer rendering implementation) for purposes of displaying the frame on a screen or display.

In graphics processing, it is known that there are rendering stages or steps that are performed on an auxiliary surface, and then added to, for example, pre-target surface 623. These can include, for example, fog effects, an additional lighting pass or some post-processing filter. Given this type of graphics processing, the methods described herein can be used to optimize performance for these rendering stages in a similar manner. Moreover, the described methods can be used for processing of shadow or lighting effects. For example, the methods can be used to reduce the resolution of shadow maps, (i.e., more generally, calculating shadow maps with affine or a more complex transform).

In an implementation, post-processing steps are performed on pre-target surface 623, for example, but in certain cases the post-processing steps can be performed on intermediate surface 611, for example. In this later case, the post-processing steps may need to be adjusted to reflect the affine transformation.

As noted above, the amount of blur or reduction factor and the blurring direction is controlled via the affine transformation, i.e., the modified projection matrix 607 (block 610). This takes advantage of the fact that when camera motion is present, the perceived resolution along the motion direction is significantly lower and an image that is blurred in the direction of motion is imperceptible by the user. In an implementation, image blurring can be introduced in a direction perpendicular to the scene or camera motion since during motion the perceived isotropic resolution is also lowered. In an implementation, the reduction factor is a tuneable parameter that is set by, for example, a game designer or similarly suited user. The selected reduction factor results in no visible artifacts or is imperceptible to the user.

FIGS. 7A-7E provide illustrative examples of how modified projection matrix 607 can control blurring. Although the final resulting image would look geometrically the same, the level and direction of blurring can be different. FIG. 7A is an example of non-directional blurring. That is, blurring is employed in all directions. FIG. 7B is an example of horizontal blurring. That is, blurring is employed in the x direction and the image will remain unaffected in the y direction. FIG. 7C is an example of vertical blurring. That is, blurring is employed in the y direction and the image will remain unaffected in the x direction. FIG. 7D is an example of −45° blurring. That is, blurring is employed in the −45° direction and the image will remain unaffected in the +45° direction. FIG. 7E is an example of −45° blurring with some non-directional blurring. That is, there is some blurring employed in all directions but greater blurring is employed in the −45° direction.

Referring now to FIG. 8A, modified projection matrix 607 causes a parallelogram 805 to be generated that fits within the screen area 810. Techniques are used to ensure that areas outside of parallelogram 805 are not processed or rendered. In an implementation, a view area 815 is set to the co-axial bounding rectangle of parallelogram 805. This prohibits the graphics processor to draw outside the bounding rectangle.

A variety of techniques can then be used to prohibit drawing irrelevant areas 820 of view area 815. In an implementation, for every rendered primitive vertex an additional condition is tested to determine whether the primitive is outside parallelogram 805. The primitive is drawn if one of the primitive's vertices is inside parallelogram 805. In an implementation, a depth buffer corresponding to irrelevant areas 820 is set to have a minimal depth. This instructs the graphics processor to skip drawing in irrelevant areas 820 because those pixels will be occluded. This is done in the rasterizer stage, therefore bypassing the pixel shader completely. In an implementation, the later technique can be used without implementing the former technique without significant loss in performance. The use of predicates can increase processing efficiency.

Referring now also to FIG. 8B, in an implementation, additional shifting and rotation of parallelogram 805 in screen area 810 and/or view area 815 can result in further optimization. This shifting and rotation is visible only on intermediate surface 611. The final resulting image is geometrically the same as unaltered final image on a target surface 627.

In an implementation, hardware modifications to the 3D graphics processing pipeline can eliminate rendering outside parallelogram 805. This is implemented by using an additional transformation matrix to efficiently filter out rendered and non-rendered vertices. In a conventional implementation, every vertex coordinate is converted into "clip space" if the primitive is outside the permitted range and is not rendered. This is done early in the rendering process, thus eliminating unnecessary computations. With the added affine correction this check would allow more vertices to be rendered, but in actuality the same vertices should be rendered as for an unmodified scene. To make this test work efficiently, the renderer/graphics processor needs to know the original projection matrix in addition to the modified projection matrix. Thus, the graphics processor applies two transformations for each vertex, one transformation for drawing, and one transformation for clipping. By making changes to the rasterizer stage, and providing it with parallelogram equations in 2D screen space, the graphics processor avoids sending unnecessary pixels through the graphics processing pipeline.

In an implementation, the graphics processor is modified to skip rendering for some pixels. For example, the graphics processor renders only pixels in a checkerboard pattern. This reduces the amount of rendered pixels by 50%, thus reducing computation time. After the rendering of the scene is finished, an additional pass is executed to "fill-in" the gaps by a demosaicing-like algorithm, (e.g., Bayer demosaicing like algorithms). This demosaicing can be efficiently implemented in the graphics processor. This method can also be implemented in software. Other alternating or skipping patterns can be used.

In an implementation, when rendering is performed with anti-aliasing, intermediate surface 611 has several times greater resolution than the final output resolution. This is still true for intermediate surface 611, but it is not necessary for the surface being displayed, i.e., the pre-target surface 623/target surface 627. Pre-target surface 623/target surface 627 can be a non-anti-aliasing surface without losing quality.

In an implementation, the furthest background is drawn with a lot of blurring, and then transformed into an intermediate image or onto an intermediate surface 611. The remaining parts of the scene are overlaid, and then transformed again onto the pre-target 623/target 627 surfaces.

In an implementation, the projection matrix used in 3D rendering is a 4×4 matrix, which transforms coordinates from clip space to screen space. After the clip-space (x,y,z,w) vector is multiplied by the matrix, this produces a new (x,y,z,w) vector. At the last stage, each (x,y,z) is divided by (w) to get screen coordinates. The transformation is:

$$R\text{screen} = \text{ProjMat} * R\text{clip} \qquad \text{Equation 1}$$

By adding an affine transformation in (x-y) plane to the projection matrix, the modified projection matrix will translate into an affine transformation in screen space (the z and w parameters are not affected):

$$\text{ProjMat1} = \text{AffineXYMult} * \text{ProjMat} \qquad \text{Equation 2}$$

$$\text{AffineXYMult} = [a\ b\ 0\ dx;\ c\ d\ 0\ dy;\ 0\ 0\ 1\ 0;\ 0\ 0\ 0\ 1] \qquad \text{Equation 3}$$

where dx and dy are responsible for shift.
The transformed coordinates in screen space are:

$$R1\text{screen} = \text{ProjMat1} * R\text{clip} = \text{AffineXYMult} * R\text{screen} \qquad \text{Equation 4}$$

The division by (w) is the same on both sides of equation so the equation holds. Therefore, the result is an affine transformation of the original image but in screen coordinates. This makes it possible to apply a correcting transformation also in screen space:

$$R2\text{screen} = \text{inv}(\text{AffineXYMult}) * R1\text{screen}$$

$$= \text{inv}(\text{AffineXYMult}) * \text{AffineXYMult} * R\text{screen}$$

$$= R\text{screen} \qquad \text{Equation 5}$$

In other words, after distorting the image by using a modified projection matrix, the image is corrected by a 2D affine transformation. Since the distorted image has a smaller area (smaller amount of pixels), the image is rendered faster.

Although the methods described herein are described with respect to camera motion, the methods can also be implemented to simulate a motion blur effect in certain situations.

In general, a method for accelerating rendering of a graphics image includes a projection matrix that is modified based on camera motion and direction to generate a reduced area 2D image based on a 3D geometry, where the reduced area 2D image is smaller than a size of a screen. The reduced area 2D image is rendered onto an intermediate surface. A rectified reduced area 2D image is then rendered onto a target surface at a modified resolution and information objects are rendered onto the target surface at an original resolution. In an implementation, a reduction factor along a camera motion direction is used to modify the projection matrix. In an implementation, the reduction factor is selected to impart an imperceptible blur to a user and reduce a number of pixels to be rendered. In an implementation, the rectified reduced area 2D image is rectified to the size of the screen. In an implementation, the modifying step and each rendering step is performed on a per-frame basis. In an implementation, different reduction factors are used for different portions of the screen. In an implementation, different reduction factors are used for different objects in the graphics image. In an implementation, the reduction factor is also along a direction perpendicular to the camera motion direction.

In general, a graphics processor includes a projection matrix stored in memory, where the projection matrix is modified based on camera motion and direction to generate a reduced area 2D image based on a 3D geometry, and where the reduced area 2D image is smaller than a size of a screen. The graphics processor also includes a renderer operable to: render the reduced area 2D image onto an intermediate surface; render a rectified reduced area 2D image onto a target surface at a modified resolution; and render information objects onto the target surface at an original resolution. In an implementation, a reduction factor along a camera motion direction is used to modify the projection matrix. In an implementation, the reduction factor is selected to impart an imperceptible blur to a user and reduce a number of pixels to be rendered. In an implementation, the rectified reduced area 2D image is rectified to the size of the screen. In an implementation, the projection matrix is modified on a per-frame basis and the renderer renders on the per-frame basis. In an implementation, different reduction factors are used for different portions of the screen. In an implementation, different reduction factors are used for different objects in the graphics image. In an implementation, the reduction factor is also along a direction perpendicular to the camera motion direction.

In general, a non-transitory computer-readable storage medium stores a set of instructions for execution by a processor to accelerate rendering of a graphics image in a graphics processor. The instructions include modifying a projection matrix based on camera motion and direction to generate a reduced area 2D image based on a 3D geometry, where the reduced area 2D image is smaller than a size of a screen; rendering the reduced area 2D image onto an intermediate surface; rendering a rectified reduced area 2D image onto a target surface at a modified resolution; and rendering information objects onto the target surface at an original resolution. In an implementation, a reduction factor along a camera motion direction is used to modify the projection matrix and the reduction factor is selected to impart an imperceptible blur to a user and reduce a number of pixels to be rendered. In an implementation, the rectified reduced area 2D image is rectified to the size of the screen. In an implementation, the modifying step and each rendering step is performed on a per-frame basis.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for accelerating rendering of a graphics image, the method comprising:
    modifying a projection matrix based on camera motion and direction to generate a reduced area 2D image based on a 3D geometry, wherein the reduced area 2D image is smaller than a size of a screen;
    rendering the reduced area 2D image onto an intermediate surface;
    rendering a rectified reduced area 2D image onto a target surface at a modified resolution; and
    rendering information objects onto the target surface at an original resolution.

2. The method of claim 1, wherein a reduction factor along a camera motion direction is used to modify the projection matrix.

3. The method of claim 2, wherein the reduction factor is selected to impart an imperceptible blur to a user and reduce a number of pixels to be rendered.

4. The method of claim 3, wherein the reduction factor is also along a direction perpendicular to the camera motion direction.

5. The method of claim 1, wherein the rectified reduced area 2D image is rectified to the size of the screen.

6. The method of claim 1, wherein the modifying step and each rendering step is performed on a per-frame basis.

7. The method of claim 1, wherein different reduction factors are used for different portions of the screen.

8. The method of claim 1, wherein different reduction factors are used for different objects in the graphics image.

9. A graphics processor comprising:
    a projection matrix stored in memory, wherein the projection matrix is modified based on camera motion and direction to generate a reduced area 2D image based on a 3D geometry, and wherein the reduced area 2D image is smaller than a size of a screen;
    a renderer operable to:
        render the reduced area 2D image onto an intermediate surface;

render a rectified reduced area 2D image onto a target surface at a modified resolution; and render information objects onto the target surface at an original resolution.

10. The graphics processor of claim 9, wherein a reduction factor along a camera motion direction is used to modify the projection matrix.

11. The graphics processor of claim 10, wherein the reduction factor is selected to impart an imperceptible blur to a user and reduce a number of pixels to be rendered.

12. The graphics processor of claim 11, wherein the reduction factor is also along a direction perpendicular to the camera motion direction.

13. The graphics processor of claim 9, wherein the rectified reduced area 2D image is rectified to the size of the screen.

14. The graphics processor of claim 9, wherein the projection matrix is modified on a per-frame basis and the renderer renders on the per-frame basis.

15. The graphics processor of claim 9, wherein different reduction factors are used for different portions of the screen.

16. The graphics processor of claim 9, wherein different reduction factors are used for different objects in the graphics image.

17. A non-transitory computer-readable storage medium storing a set of instructions for execution by a processor to accelerate rendering of a graphics image in a graphics processor, comprising:

modifying a projection matrix based on camera motion and direction to generate a reduced area 2D image based on a 3D geometry, wherein the reduced area 2D image is smaller than a size of a screen;

rendering the reduced area 2D image onto an intermediate surface;

rendering a rectified reduced area 2D image onto a target surface at a modified resolution; and rendering information objects onto the target surface at an original resolution.

18. The non-transitory computer-readable storage medium according to claim 17, wherein a reduction factor along a camera motion direction is used to modify the projection matrix and the reduction factor is selected to impart an imperceptible blur to a user and reduce a number of pixels to be rendered.

19. The non-transitory computer-readable storage medium according to claim 17, wherein the rectified reduced area 2D image is rectified to the size of the screen.

20. The non-transitory computer-readable storage medium according to claim 17, wherein the modifying step and each rendering step is performed on a per-frame basis.

* * * * *